June 17, 1930. I. H. SPOOR 1,764,125
REEL
Filed Oct. 6, 1927 2 Sheets-Sheet 1

Witness:
R. Burkhardt

Inventor
Ivan H. Spoor
By Cromwell, Grist + Worden
Attys

June 17, 1930.  I. H. SPOOR  1,764,125
REEL
Filed Oct. 6, 1927  2 Sheets-Sheet 2

Witness
R. Burkhardt

Inventor
Ivan H. Spoor
By Cromwell, Greist & Warden
Attys

Patented June 17, 1930

1,764,125

UNITED STATES PATENT OFFICE

IVAN H. SPOOR, OF BERWYN, ILLINOIS, ASSIGNOR TO THE GERRARD COMPANY, INC., OF CHICAGO, ILLINOIS, A CORPORATION OF DELAWARE

REEL

Application filed October 6, 1927. Serial No. 224,294.

The present invention has to do with reels for holding coils of wire.

One object of the invention is to provide an improved reel which may be rolled about easily from one place to another, and which, on reaching the place where the wire on the reel is to be used, may be tilted over onto a pedestal, in which position it will rotate with a certain amount of resistance when the wire is pulled in being unwound.

Another object is to provide an improved reel which is light, strong, durable, and inexpensive.

Still other objects and advantages of the invention will be apparent to those skilled in the art upon a full understanding of the construction, arrangement and operation of the improved reel.

One form of the invention is presented herein for the purpose of exemplification, but it will of course be appreciated that the invention is susceptible of embodiment in other structurally modified forms coming equally within the scope of the appended claims.

Figure 1:
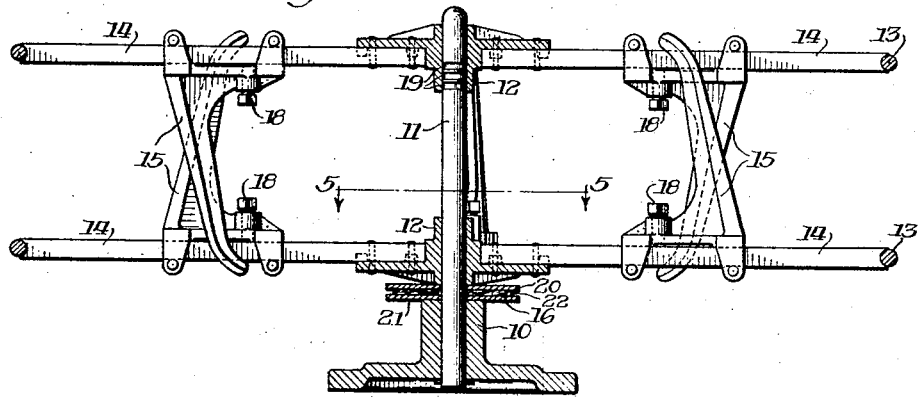
Fig. 1 is a diametric section through a reel constructed in accordance with the invention, the section being taken on the line 1—1 of Fig. 2.
Figure 2:
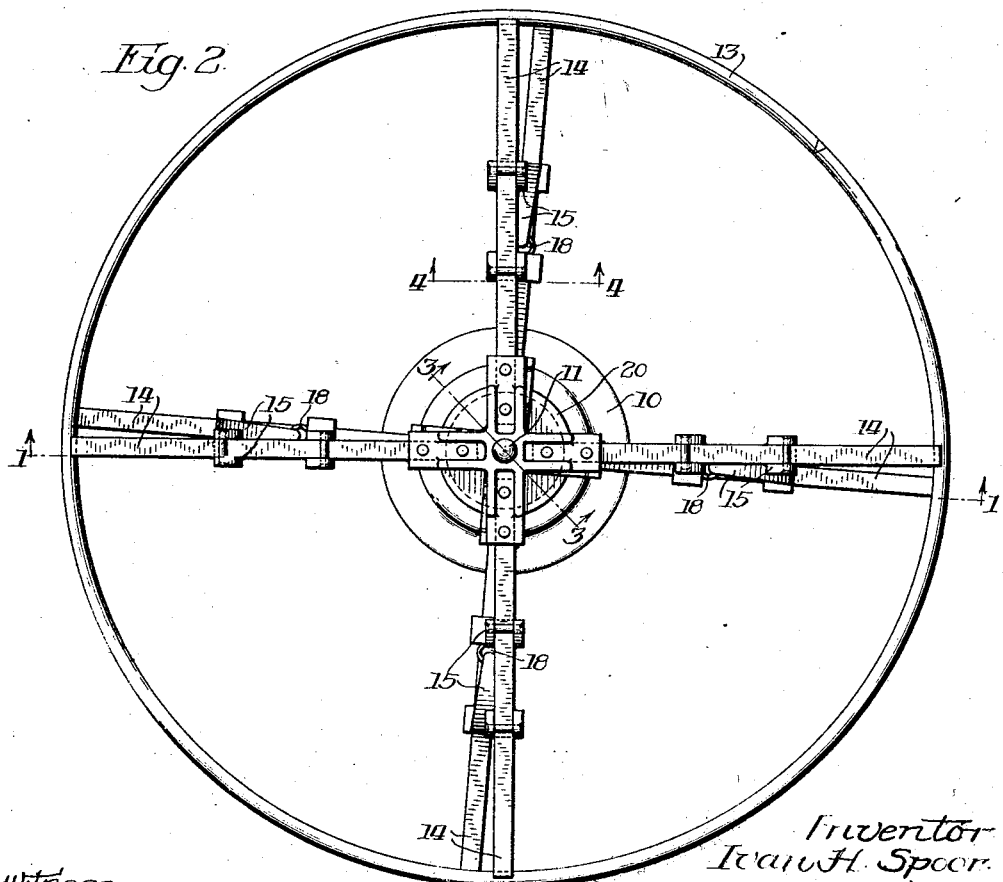
Fig. 2 is an end view of the reel.
Figure 3:
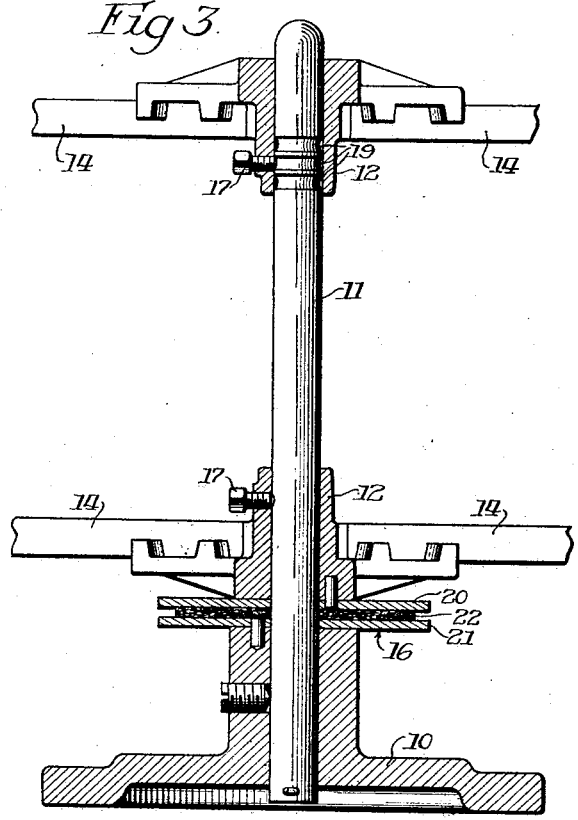
Fig. 3 is a fragmentary section, taken on the line 3—3 of Fig. 2.
Figure 4:
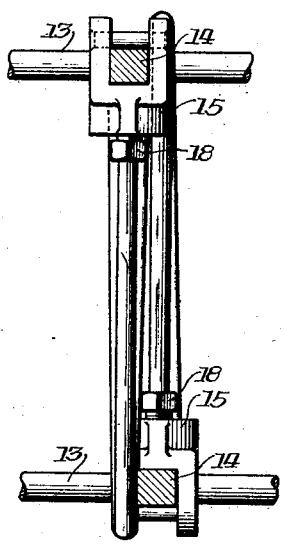
Fig. 4 is a fragmentary section, taken on the line 4—4 of Fig. 2.
Figure 5:
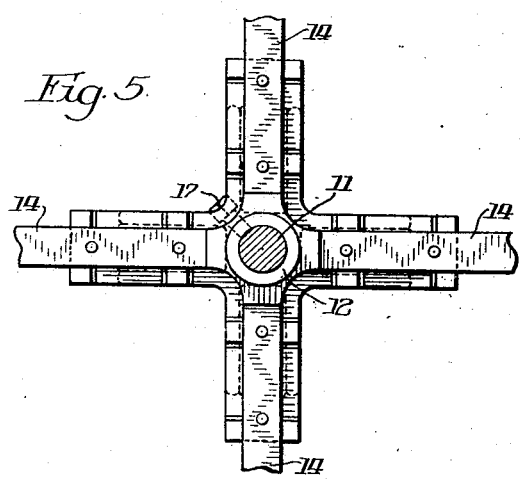
Fig. 5 is a fragmentary section, taken on the line 5—5 of Fig. 1.

As will be observed in the drawings, the reel includes a pedestal 10, a shaft 11, two hubs 12, two rims 13, a number of spokes 14, a number of brackets 15, and a friction device 16. One end of the shaft is journaled in the pedestal, and the hubs are secured to the shaft in spaced relation to each other by set screws 17. The spokes connect the hubs with the rims, and the brackets are slidably mounted on the spokes, being adjustably positioned thereon by set screws 18. The brackets carried by one side of the reel project through the openings in the other side, and are arranged angularly with respect to the axis of the reel whereby to center the wire between the sides of the reel irrespective of the size of the coil. The distance between the sides of the reel may be varied by adjusting the position of the uppermost hub on the shaft, a number of recesses 19 being provided in the shaft for cooperation with the set screw used to secure that hub in position.

The friction device consists of a disk 20 which is pinned to the lower hub, a disk 21 which is pinned to the pedestal, and a pad 22 of felt or other suitable material which is positioned between the disks 20 and 21. When a part or all of the wire in the coil is to be unwound from the reel, the reel is tilted over onto the pedestal, and the end of the wire is pulled. The friction device prevents the wire from loosening up and becoming tangled about the reel, since it offers enough resistance to the turning of the reel to prevent the latter from paying out the wire too fast. The reel may be loaded easily with a coil of wire by merely removing the upper end member of the reel and placing the coil over the upwardly converging brackets on the lower end member.

I claim:

1. In a device of the character described, a pedestal, and a reel rotatably mounted on the pedestal, said reel having two spaced circular rims of equal diameter on which the reel will roll without tipping over, and said pedestal being of smaller diameter than the rims and of insufficient weight to tip the reel over when the reel is rolled.

2. In a device of the character described, a pedestal, and an exteriorly circular reel rotatably mounted on the pedestal, said reel being of greater diameter than the pedestal whereby to permit the reel to be tilted on edge and rolled from one place to another.

3. In a device of the character described, a pedestal, a reel rotatably mounted on the pedestal, a disk secured to the reel, another disk secured to the pedestal, and a pad of friction material positioned between the disks for yieldingly resisting rotation of the reel on the pedestal.

4. In a device of the character described, a pedestal, a reel rotatably mounted on the pedestal in a plane parallel to the base of the same, a disk secured to the reel, another disk secured to the pedestal, and a pad of felt positioned between the disks for yieldingly resisting rotation of the reel on the pedestal when the pad is compressed between the disks by the weight of the reel.

5. In a device of the character described, a pedestal, a shaft journaled in the pedestal in perpendicular relation to the base of the same, and two reel end members rigidly secured to the shaft above the pedestal for supporting therebetween a coil of wire.

6. In a device of the character described, a pedestal, a shaft journaled in the pedestal in perpendicular relation to the base of the same, two reel end members secured to the shaft above the pedestal, and means for shifting the top end member toward or away from the bottom end member along the shaft whereby to vary the width of the reel.

7. In a device of the character described, a shaft, two hubs secured to the shaft, a number of spokes secured to the hubs and extending outwardly from the same, two rims secured to the outer ends of the spokes, and a number of coil-positioning brackets secured to the spokes for supporting between the rims a coil of wire.

8. In a device of the character described, a shaft, two hubs secured to the shaft, a number of spokes secured to the hubs and extending outwardly from the same, two rims secured to the outer ends of the spokes, and a number of coil-positioning brackets secured to the spokes, said brackets being shiftable longitudinally of the spokes whereby to accommodate coils of various diameters between the rims.

9. In a device of the character described, a shaft, two hubs secured to the shaft, a number of spokes secured to the hubs and extending outwardly from the same, two rims secured to the outer ends of the spokes, and a number of coil-positioning brackets secured to the spokes, said brackets extending angularly from the sides of the reel in crossed relation whereby to center a coil between such sides.

In testimony whereof I have hereunto subscribed my name.

IVAN H. SPOOR.